(12) United States Patent
Essex

(10) Patent No.: US 11,772,900 B2
(45) Date of Patent: Oct. 3, 2023

(54) CONVEYOR SYSTEMS INCLUDING AWARENESS FLAG MECHANISMS

(71) Applicant: Toyota Motor Engineering & Manufacturing North America, Inc., Plano, TX (US)

(72) Inventor: Stephen R. Essex, Waddy, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/562,134

(22) Filed: Dec. 27, 2021

(65) Prior Publication Data

US 2023/0202764 A1 Jun. 29, 2023

(51) Int. Cl.
*B65G 43/00* (2006.01)
*B65G 41/00* (2006.01)

(52) U.S. Cl.
CPC ........... *B65G 43/00* (2013.01); *B65G 41/006* (2013.01); *B65G 2203/0208* (2013.01); *B65G 2203/04* (2013.01)

(58) Field of Classification Search
None
See application file for complete search history.

(56) References Cited

U.S. PATENT DOCUMENTS

| | | | |
|---|---|---|---|
| 9,420,900 B1 * | 8/2016 | Simpson | ................... B65G 1/08 |
| 9,972,205 B2 * | 5/2018 | Beaulieu | .............. G08G 1/0955 |
| 10,294,036 B2 | 5/2019 | Scheffer | |
| 2008/0045100 A1 | 2/2008 | Dungan | |

FOREIGN PATENT DOCUMENTS

| | | |
|---|---|---|
| CN | 205794565 U | 12/2016 |
| CN | 108213363 B | 6/2018 |
| KR | 20210061488 A | 5/2021 |

* cited by examiner

*Primary Examiner* — William R Harp
(74) *Attorney, Agent, or Firm* — Dinsmore & Shohl LLP

(57) ABSTRACT

A conveyor system includes at least one conveyor table and an awareness flag mechanism. The awareness flag mechanism includes a support rod mounted to the at least one conveyor table and extending outwardly therefrom in a cross-conveying direction. A counterweight assembly includes a support shaft pivotally connected to the support rod. The support shaft has a resiliently flexible portion. Aa counterweight is located at a lower end of the support shaft. Aa flag is located at an opposite, upper end of the support shaft. The counterweight biases the counterweight assembly toward an upright, awareness configuration where the flag is located above a conveying surface of the at least one conveyor table.

10 Claims, 3 Drawing Sheets

CONVEYOR SYSTEMS INCLUDING AWARENESS FLAG MECHANISMS

TECHNICAL FIELD

The present specification generally relates to conveyor systems used transfer components and, more specifically, to conveyor systems that include awareness flag mechanisms that provide an indication of when to reload the conveyor systems.

BACKGROUND

Conveyor systems are commonly used to store and/or transfer components, parts, etc. The conveyor systems may have a plurality of rollers so that containers, pallets, components and/or component trays can be moved from one location to another location. Such conveyor systems can facilitate movement of the components and/or component trays from one location to another.

Often, conveyor systems may have a picking side and a loading side. The picking side and the loading side may not be covered by the same person or persons. For example, one person may pick components or containers from the pick side while a different person may load the components or containers while or after components are removed. This loading of components may require determining visually that items have been removed from the conveyor system.

Accordingly, a need exists for conveyor systems that include awareness flag mechanisms that provide a visual signal or indication of when to reload the conveyor systems.

SUMMARY

In one embodiment, a conveyor system includes at least one conveyor table and an awareness flag mechanism. The awareness flag mechanism includes a support rod mounted to the at least one conveyor table and extending outwardly therefrom in a cross-conveying direction. A counterweight assembly includes a support shaft pivotally connected to the support rod. The support shaft has a resiliently flexible portion. Aa counterweight is located at a lower end of the support shaft. Aa flag is located at an opposite, upper end of the support shaft. The counterweight biases the counterweight assembly toward an upright, awareness configuration where the flag is located above a conveying surface of the at least one conveyor table.

In another embodiment, a method of providing an indication of a need to load a conveyor system is provided. The method includes mounting a support rod to a side of a conveyor table and mounting a counterweight assembly to the support rod such that the counterweight assembly pivots between an upright, awareness configuration and a lowered, down configuration. The awareness flag mechanism includes a support rod mounted to the at least one conveyor table and extending outwardly therefrom in a cross-conveying direction. Aa counterweight assembly includes a support shaft pivotally connected to the support rod, the support shaft having a resiliently flexible portion. A counterweight is located at a lower end of the support shaft. A flag is located at an opposite, upper end of the support shaft. The counterweight biases the counterweight assembly toward the upright, awareness configuration where the flag is located above a conveying surface of the at least one conveyor table.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to a conveyor system that includes an awareness flag mechanism that is used to identify when to reload the conveyor system. The conveyor system includes at least one conveyor table and the awareness flag mechanism. The awareness flag mechanism includes a support rod mounted to the at least one conveyor table and extending outwardly therefrom in a cross-conveying direction. A counterweight assembly includes a support shaft pivotally connected to the support rod. The support shaft includes a resiliently flexible portion. A counterweight is located at a lower end of the support shaft. A flag is located at an opposite, upper end of the support shaft. The counterweight biases the counterweight assembly toward an upright, awareness configuration where the flag is located above a conveying surface of the at least one conveyor table.

Figure 1:
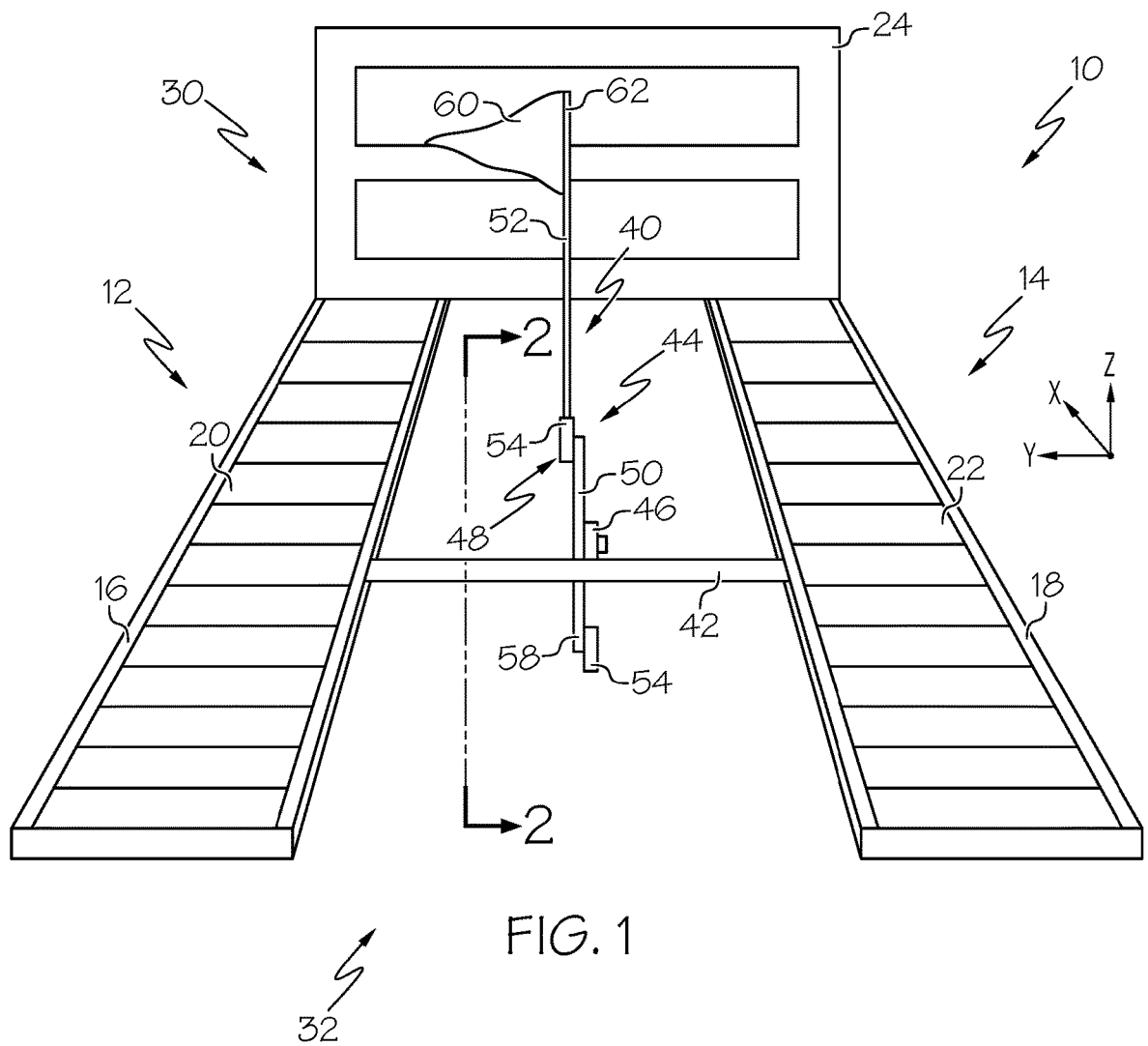
FIG. 1 is a diagrammatic view of a conveyor system including an awareness flag mechanism, according to one or more embodiments shown and described herein.

Referring to FIG. 1, a conveyor system 10 includes parallel conveyor tables 12 and 14. While two conveyor tables 12 and 14 are illustrated, there may be more than two conveyor tables or one conveyor table. The conveyor tables 12 and 14 each include a support frame 16 and 18 that support an array of rollers 20 and 22 where each array of rollers 20 and 22 defines a conveying surface along which an item 24 is conveyed. It should be noted that while rollers 20 and 22 are illustrated, any suitable conveying mechanism may be used that defined a conveying surface, such as a belt, roller balls, etc. Further, while the item 24 depicted is a container, the item may be a pallet, a tray, a bin or even a component itself used in an assembly process.

The conveyor system 10 generally includes a pick side 30, which is the far side of the conveyor tables 12 and 14, and a load side 32, which is the near side of the conveyor tables 12 and 14. An operator may deliver the item 24 to the load side 32 of the conveyor tables 12 and 14 when another item 24 is removed by an operator at the pick side 30 of the conveyor tables 12 and 14. The conveyor tables 12 and 14 may be slanted downward (e.g., less than 45 degrees) relative to horizontal so that gravity can be used to move the item 24 along the conveying surfaces. In other embodiments, an actuator, such as a motor, may be used to drive the rollers 20 and 22 or other suitable conveying mechanism to move the items 24 automatically.

An awareness flag mechanism 40 is located between the conveyor tables 12 and 14. The awareness flag mechanism 40 includes a support rod 42 mounted to one or both of the conveyor tables 12 and 14. In particular, the support rod 42 may be mounted to both of the support frames 16 and 18 (using bolts, welding, etc.) such that the support rod 42 extends transverse to a conveying direction of the conveyor tables 12 and 14 (i.e., in the X direction) and in a cross-conveying direction (i.e., in the Y direction). A counterweight assembly 44 is mounted to the support rod 42 using a pivot rod 46. The pivot rod 46 may be mounted to the support rod 42 and extend in the conveying direction away from the support rod 42. The counterweight assembly 44 includes a support shaft 48 pivotally connected to the support rod 42 via the pivot rod 46. The support shaft 48 includes a relatively rigid portion 50 that can be formed by a metal rod, such as a steel or aluminum rod and a relatively flexible portion 52 that is also resilient such that when bent, the flexible portion 52 returns to its initial shape. The flexible portion 52 may be formed by a flag shaft that is mounted to the ridged portion 50 by a tube 53. A counterweight 54 is located at a lower end 58 of the support shaft 48. A flag 60 is located at an opposite, upper end 62 of the support shaft 48. The counterweight 54 biases the counterweight assembly 44 like a pendulum toward an upright, awareness configuration where the flag 60 is located above the conveying surfaces of the conveyor tables 12 and 14, as shown by FIG. 1.

Figure 2:
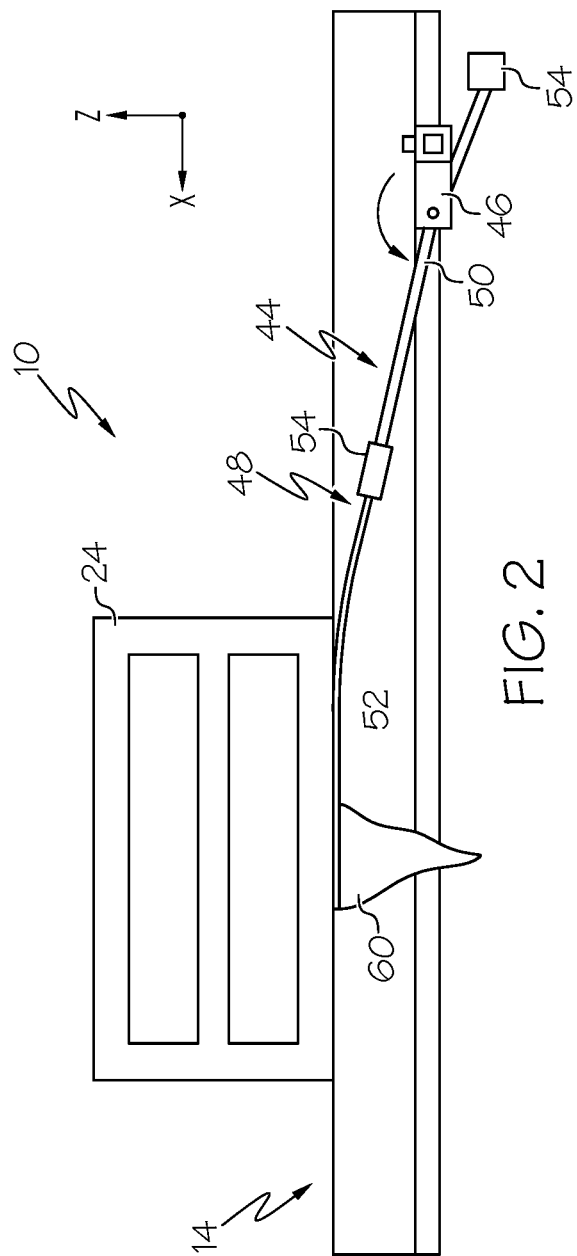
FIG. 2 is a diagrammatic view along line 2-2 of the conveyor system of FIG. 1, according to one or more embodiments shown and described herein.

Referring to FIG. 2, the support shaft 48 is pivotally connected to the pivot rod 46 at pivot axis 64 such that the support shaft 48 rotates when a force is applied to the flexible portion 52 of the support shaft 48. In FIG. 2, the flag 60 is illustrated in a down configuration such that at least a portion of the flag 60 is located below the conveying surfaces of the conveyor tables 12 and 14. When the item 24 passes the support shaft 48, the support shaft 48 including the flag 60 returns to its initial upright, awareness configuration due to the gravity bias that is provided by the counterweight 54 and the resiliency provided by the flexible portion 52 of the support shaft 48.

Figure 3:
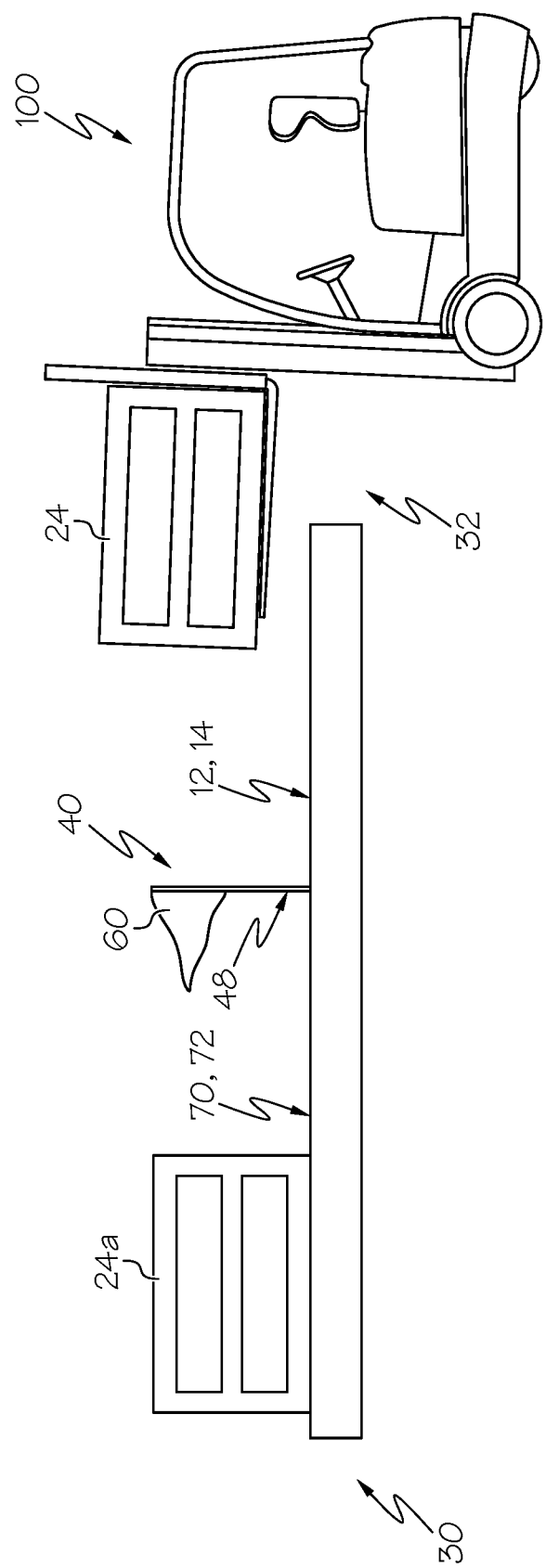
FIG. 3 is a diagrammatic side view of the conveyor system of FIG. 1 in operation, according to one or more embodiments shown and described herein.

Referring now to FIG. 3, a process of providing an indication to an operator of a need to load the conveyor system is illustrated. When the awareness flag mechanism 40 is in the upright, awareness configuration, an operator, such as in forklift 100 an visually see the flag 60. When the flag is in the upright position as illustrated, the forklift 100 can be used to place an item 24 on the conveying surfaces 70 and 72 of the conveyor tables 12 and 14. Once placed on the conveying surfaces 70 and 72, the item 24 can move (e.g., roll) in the conveying direction from the load side 32 toward the pick side 30. As the item 24 moves, it moves over the support shaft 48 causing the support shaft 48 to rotate, as shown by FIG. 2. When the item 24 comes to rest, it can rest on the support shaft 48 holding the awareness flag mechanism 40 in the down configuration with the flag 60 at least partially below the conveying surfaces 70 and 72. When an item 24a is removed from the conveying surfaces 70 and 72, the next item 24 can move to the pick side 30 and the awareness flag mechanism 40 can return to its initial upright, awareness configuration due to the gravity bias that is provided by the counterweight 54 and the resiliency provided by the flexible portion 52 of the support shaft 48.

The above-described awareness flag mechanisms alert operators to load the conveyor systems with items when the awareness flag mechanisms are in their upright, awareness configurations. The use of counterweights bias the support shafts toward the upright configuration in a reliable fashion like a pendulum. The flags can be a visually stimulating color, such as orange so that the need to provide an item can be easily identified.

While two conveyor tables are discussed primarily above, the awareness flag mechanisms may be mounted to a single conveyor table. Further, while the support rod is shown as mounted to a side of the conveyor table, the support rod may be mounted beneath the conveyor surface or at any other suitable location such that the awareness flag mechanism is located in the path of an item being conveyed in the conveying direction. Any suitable counterweight may be used that is able to bias the awareness flag mechanism toward the upright, awareness configuration. As examples, the counterweight may be between one and 10 pounds or more. The flexible portion of the support shaft may be formed of any suitable bendable material, such as a plastic material, such that the flexible portion bends, but does not break under normal operating conditions and returns to the upright configuration once a load is removed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A conveyor system comprising:
at least one conveyor table; and
an awareness flag mechanism comprising:
a support rod mounted to the at least one conveyor table and extending outwardly therefrom in a cross-conveying direction;
a counterweight assembly comprising a support shaft pivotally connected to the support rod, the support shaft having a resiliently flexible portion;
a counterweight at a lower end of the support shaft; and
a flag at an opposite, upper end of the support shaft, the counterweight biasing the counterweight assembly toward an upright, awareness configuration where the flag is located above a conveying surface of the at least one conveyor table.

2. The conveyor system of claim 1, wherein the counterweight assembly is pivotally connected to a pivot rod that extends outward from the support rod in a conveying direction.

3. The conveyor system of claim 2, wherein the support shaft includes a rigid portion that is formed by a metal rod, the rigid portion being pivotally connected to the pivot rod.

4. The conveyor system of claim 1, wherein the counterweight assembly pivots toward a down configuration with the flag at least partially below the conveying surface.

5. The conveyor system of claim 1 comprising a pair of conveyor tables, the support rod mounted to both of the conveyor tables.

6. A method of providing an indication of a need to load a conveyor system, the method comprising:
- mounting a support rod to a side of a conveyor table, the support rod extending outwardly from the side of the conveyor table in a cross-conveying direction;
- mounting a counterweight assembly comprising a counterweight to a lower end of a support shaft;
- mounting the support shaft having a resiliently flexible portion to the support rod such that the counterweight assembly pivots between an upright, awareness configuration and a lowered, down configuration, the support shaft having a flag at an opposite, upper end of the support shaft, the counterweight biasing the counterweight assembly toward the upright, awareness configuration where the flag is located above a conveying surface of the at least one conveyor table.

7. The method of claim 6 pivotally connecting the counterweight assembly to a pivot rod that extends outward from the support rod in a conveying direction.

8. The method of claim 7, wherein the support shaft includes a rigid portion that is formed by a metal rod, the method comprising pivotally connecting the rigid portion to the pivot rod.

9. The method of claim 6 comprising pivoting the counterweight assembly pivots toward a down configuration with the flag at least partially below the conveying surface.

10. The method of claim 6 comprising a pair of conveyor tables, the method comprising mounting the support rod to both of the conveyor tables.

\* \* \* \* \*